United States Patent
Wengenroth

(10) Patent No.: US 8,998,763 B2
(45) Date of Patent: Apr. 7, 2015

(54) ROTARY SPEED-CHANGE TRANSMISSION

(75) Inventor: Volker Wengenroth, Hilden (DE)

(73) Assignee: SMS Meer GmbH, Moenchengladbach (DE)

(*) Notice: Subject to any disclaimer, the term of this patent is extended or adjusted under 35 U.S.C. 154(b) by 413 days.

(21) Appl. No.: 13/466,179

(22) Filed: May 8, 2012

(65) Prior Publication Data

US 2012/0289372 A1     Nov. 15, 2012

(30) Foreign Application Priority Data

May 11, 2011    (DE) .......................... 10 2011 101 131

(51) Int. Cl.
*F16H 1/32*       (2006.01)
*F16H 25/06*     (2006.01)

(52) U.S. Cl.
CPC ...................................... *F16H 25/06* (2013.01)

(58) Field of Classification Search
USPC .......................................... 475/162, 165, 168
See application file for complete search history.

(56) References Cited

U.S. PATENT DOCUMENTS

| | | |
|---|---|---|
| 5,989,144 A | 11/1999 | Chen |
| 6,314,826 B1 * | 11/2001 | Cunningham et al. ........ 475/168 |
| 6,416,438 B1 | 7/2002 | Choi |
| 2009/0205451 A1 | 8/2009 | Bayer |

* cited by examiner

*Primary Examiner* — Derek D Knight
(74) *Attorney, Agent, or Firm* — Andrew Wilford

(57) ABSTRACT

A transmission has a housing having a main axis with a retaining element fixed in the housing and forming a set having a predetermined number of radially extending and angularly equispaced guides. An output element rotatable in the housing about the axis is formed with an array having a number smaller than the predetermined number of radially inwardly open recesses axially adjacent the guides. An input element rotatable in the housing about the axis has a radial outer and generally circular peripheral surface centered on an axis radially offset from the main axis. Respective transmission elements radially displaceable in the guide grooves between inner and outer positions each have a shaft extending substantially parallel to the axis with a guide section engaged and radially shiftable in the respective guide groove, a driven section engageable in the recesses, and a drive section radially engageable with the input-element surface.

12 Claims, 3 Drawing Sheets

ROTARY SPEED-CHANGE TRANSMISSION

FIELD OF THE INVENTION

The present invention relates to a transmission. More particularly this invention concerns a torque-transmitting rotary transmission.

BACKGROUND OF THE INVENTION

The invention relates to a transmission for transmitting torque from a drive or input element to a driven or output element where the input element and the output element rotate about a common axis of rotation. The input element and the output element are rotatably mounted in a housing, and the input element has at least one radially outwardly directed peripheral surface engaging at least one drive section of a number of transmission elements. That the output element forms an array of a predetermined number of radially inwardly open recesses angularly equispaced about the axis and forming a contact surface for at least one driven section of the transmission elements. The transmission elements are radially displaceable in guides of at least one retaining element fixed in or on the housing. The number of transmission elements and the number of recesses are not the same.

Transmissions with which torque can be transmitted have been described in a wide variety of embodiments in the prior art. In most cases, the goal is for the transmission to have a transmission ratio that allows the input and the output shaft to rotate at different speeds.

In classical spur gears, there is linear contact on the tooth flanks of the gears involved during the transmission of torque. A high transmission ratio can usually be implemented only by using multiple spur gear stages. With a worm gear that advantageously allows high transmission ratios, there is point contact between the worm gear and the worm in the transmission of torque, which thus limits the torque that can be transmitted. In addition transmissions having a coaxial drive shaft and output shaft, referred to as so-called cyclo or harmonic drives are also known. With them, high transmission ratios can be achieved, but only relatively low torques can be transmitted.

In many mechanical engineering applications the goal is to transmit high torque at a high gear transmission ratio. This should also be possible even under a sudden load and should not result in high wear in the transmission. The above-described known designs of transmissions always fulfill these requirements only partially and in particular the transmissible torque is usually very limited so that the above-described solutions are not suitable for heavy machinery.

To remedy this situation, transmissions of the above-described type which are suitable for transmission of high torques as well as having a high transmission ratio have become known. One such transmission is described in U.S. Pat. No. 6,416,438, for example. To be able to transmit high torque at a high transmission ratio, rod-like radially displaceable transmission elements are displaced radially in a cyclic manner during operation by a cam that bears radially outward on them and is formed as an eccentric circular surface. The transmission elements each have a roller on their radial outer end engaging in the recesses of the output element. Since there are more recesses than transmission elements, the output element is rotated by a defined angle per revolution of the input element. Based on this effect a desired high transmission ratio is achieved, and high torques can be transmitted. US 2009/0205451 shows a similar system.

One disadvantage of these transmissions is that the construction effort and the technical complexity of the device are quite high and the transmissions are as a result expensive. This is due to the plurality of rod-like and radially displaceable transmission elements for each of which a precise but nevertheless smooth support bearing must be provided.

OBJECTS OF THE INVENTION

It is therefore an object of the present invention to provide an improved rotary speed-change transmission.

Another object is the provision of such an improved rotary speed-change transmission that overcomes the above-given disadvantages, in particular that provides a high transmission ratio while retaining an advantageous compact design, but at the same time it should be possible to needs to run smoothly and be of relative simple construction, in particular with respect to support of the moving parts.

SUMMARY OF THE INVENTION

A transmission has according to the invention a housing having a main axis with a retaining element fixed in the housing and forming a set having a predetermined number of radially extending and angularly equispaced guides. An output element rotatable in the housing about the axis is formed with an array having a number smaller than the predetermined number of radially inwardly open recesses axially adjacent the guides. An input element rotatable in the housing about the axis has a radial outer and generally circular peripheral surface centered on an axis radially offset from the main axis. Respective transmission elements radially displaceable in the guide grooves between inner and outer positions each have a shaft extending substantially parallel to the axis with a guide section engaged and radially shiftable in the respective guide groove, a driven section engageable in the recesses, and a drive section radially engageable with the input-element surface.

Each transmission element is preferably symmetrical relative to a center plane perpendicular to the axis of rotation. In this case, the input element, which is a disk or ring, is on the center plane. Furthermore, the output element here may be designed in two parts with two sets of recesses symmetrically flanking the center plane and at axial spaced therefrom. In addition two retaining elements formed with respective arrays of the guides can symmetrically axially flank the center plane at an axial spacing from it.

Preferably drive rollers that can roller on the drive edge surface of the input element, driven rollers in the recesses in the output element and/or guide rollers in the guide grooves of the retaining element that ensure a low-friction running are arranged on the shaft. The drive roller rolling on the drive surface of the input element is especially preferably arranged on the shaft at the center plane, with two driven rollers for rolling in the recesses of the output element symmetrical with the center plane and two guide rollers for rolling in the guides of the retaining element symmetrical with the center plane, preferably at an even greater distance from the center plane. The outside diameter of the drive roller on the drive edge of the input element is preferably greater than the outside diameter of the rollers in the recesses of the output element.

The shaft may also have an axial stop or abutment to limit axial movement of the shaft. Such an axial stop is formed in particular by at least one disk or washer between the rollers on the shaft.

Each recess in the output element preferably consists of two ramp or flat faces that flare radially outwardly and that each extend at an angle to the angular direction, that is at an acute angle to a circle centered on the axis.

The number of transmission elements is preferably lower by one than the number of recesses, producing a higher transmission ratio. The number of transmission elements is advantageously an even number. A preferred embodiment provides between 12 and 36 transmission elements.

The recesses are mostly formed like a ring gear so that the two arranged ramps mentioned above come into play, extending at an angle to the angular direction. The ramps are preferably planar. They may be connected to one another by a part-cylindrical connecting section. The above-described angle is preferably between 40° and 70°. The transition between the ramps of neighboring recesses may be designed as an point forming an acute angle.

The guide grooves for the transmission elements in the holding rings may be embodied as linear sliding guide slots.

The radially outwardly directed peripheral surface of the input element is preferably of cylindrical shape offset eccentrically from the axis of rotation. The input element is advantageously a disk the output element is annular.

The proposed transmission is preferably used in situations where very high torques must be transmitted and a great transmission ratio is required between the drive shaft and the output shaft, that is for a heavy-duty transmission. Such a suage is I particular of applications in heavy machinery, e.g., machines in the field of steel production and steel processing. One example would be the drive of a forge roller in a roller mill.

With the transmission described here, it is possible to transmit high torques at high transmission ratios. With the proposed approach, it is advantageous in particular that a rolling movement sequence of the transmission elements is made possible in the transmission of torque, so that no mentionable wear occurs even in the transmission of high torques.

It is also very advantageous that no damage to the components of the transmission need be feared even under a sudden load.

Another advantage of the proposed approach is that the transmission has a very compact design.

The concept proposed according to the invention creates in particular the great advantage that it yields a simple and inexpensive design because no additional bearing elements need be provided for rotatably supporting the transmission elements. Instead this achieves the result that through the preferred symmetrical embodiment of the transmission elements utilizing the wave structure, i.e., in particular due to the symmetrical arrangement of the rollers for the drive, for support and for output, there is no external reactive torque when a load is applied to the transmission. The shaft with the rollers mounted on it is namely more or less spanned and centered between the edge of the input element, of the output recesses, and of the guides in the retaining rings. Therefore it is not necessary to have additional bearings for the shaft with its rollers. Only the above-described axial stops in the form of stop washers or spur disks limit axial mobility and/or axial play, preferably positioned axially between the guide rollers and the output rollers.

BRIEF DESCRIPTION OF THE DRAWING

The above and other objects, features, and advantages will become more readily apparent from the following description, reference being made to the accompanying drawing in which.

DETAILED DESCRIPTION

Figure 1:
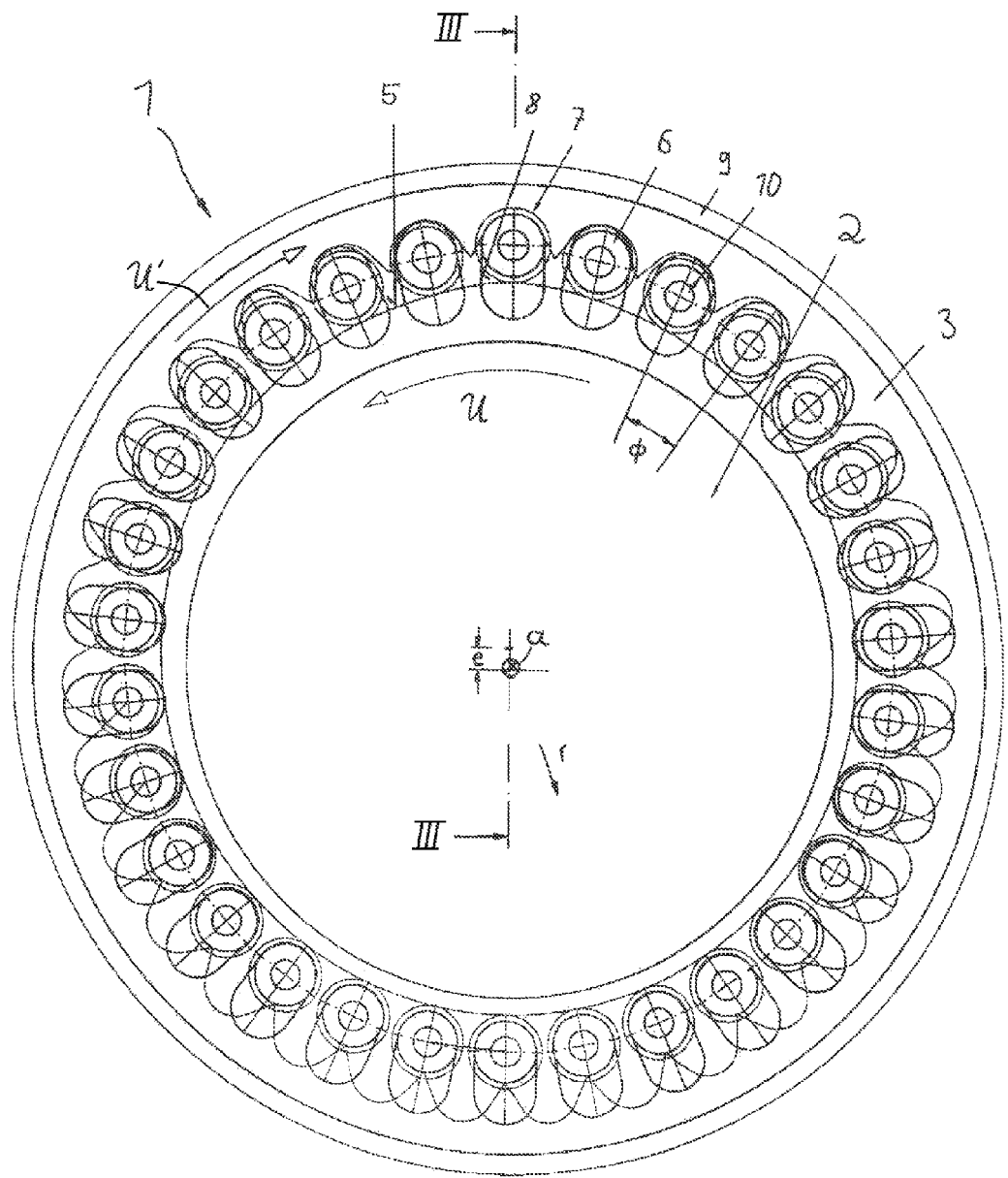
FIG. 1 is a side view of the transmission.

As seen in the drawing, a transmission 1 for use in heavy machinery for transmitting high torque at a high transmission ratio has a drive or input element 2 to which an unillustrated drive shaft can be fixed and a driven or output element 3 to which an unillustrated output shaft is also rotationally fixed. The input element 2 and the output element 3 rotate about a common axis a that here is perpendicular to the view planes of FIGS. 1 and 2.

Figure 3:
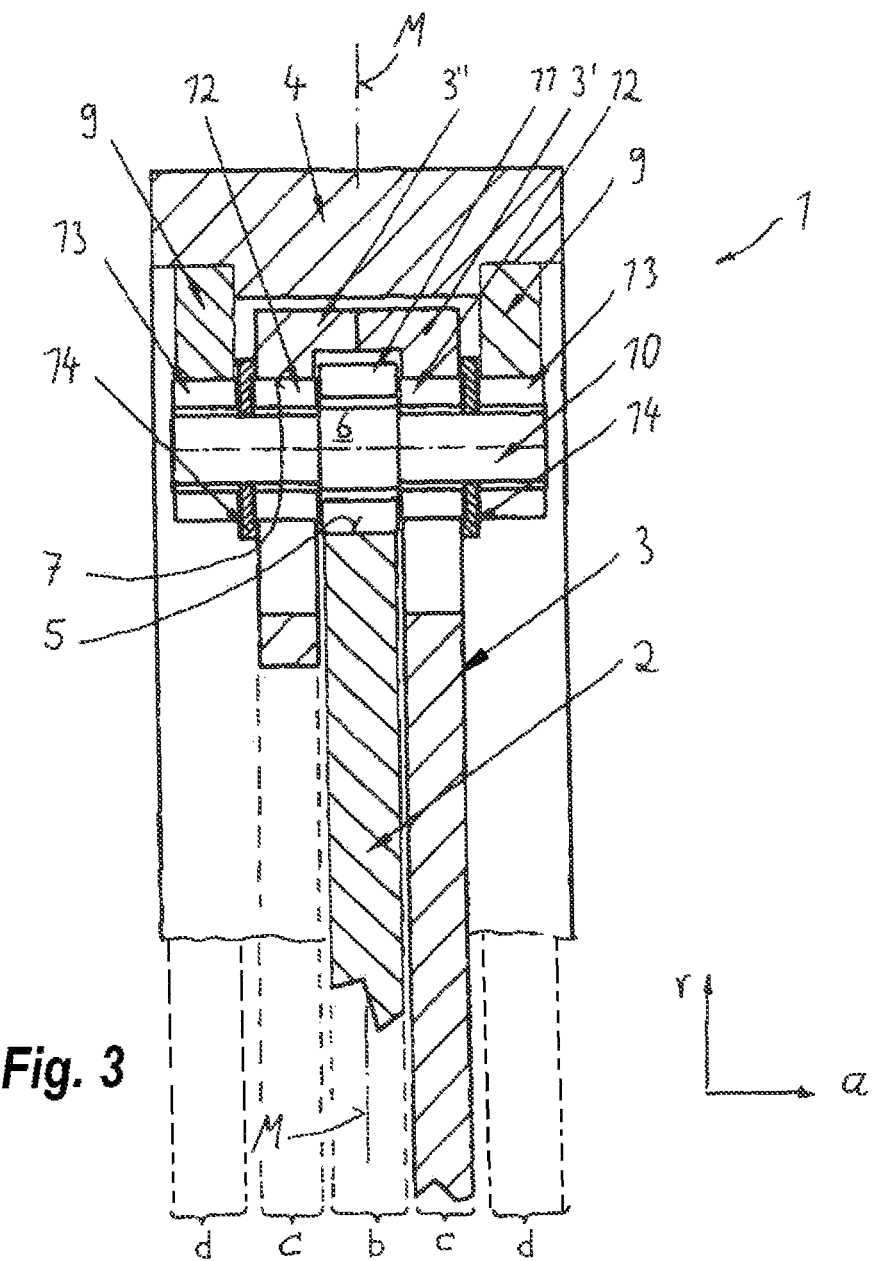
FIG. 3 is a section taken along line of FIG. 1.

The input element 2 is a disk and the output element 3 is largely annular. Both the input element 2 and the output element 3 are rotatably mounted in a normally nonrotating housing 4 (FIG. 3). Bearings that support them in the housing 4 are not shown and are standard.

The input element 2 has a radially outwardly directed peripheral edge surface 5 that is basically cylindrical serves as a guide for transmission elements 6 described in greater detail below. This guide surface 5 is offset upward in FIG. 1 by an eccentricity e to the rotation axis a.

As shown in FIG. 3, two axially spaced holding rings 9 fixed inside the housing 4 axially flank the outer periphery of the element 3 that itself axially flanks the outer periphery of the element 2. Each retaining element 9 has a plurality of guide grooves 8 extending in a radial direction r, the number of guide grooves 8 corresponds to the number n of the transmission elements 6. The grooves 8 are all identical and arranged in axially aligned pairs.

Figure 2:
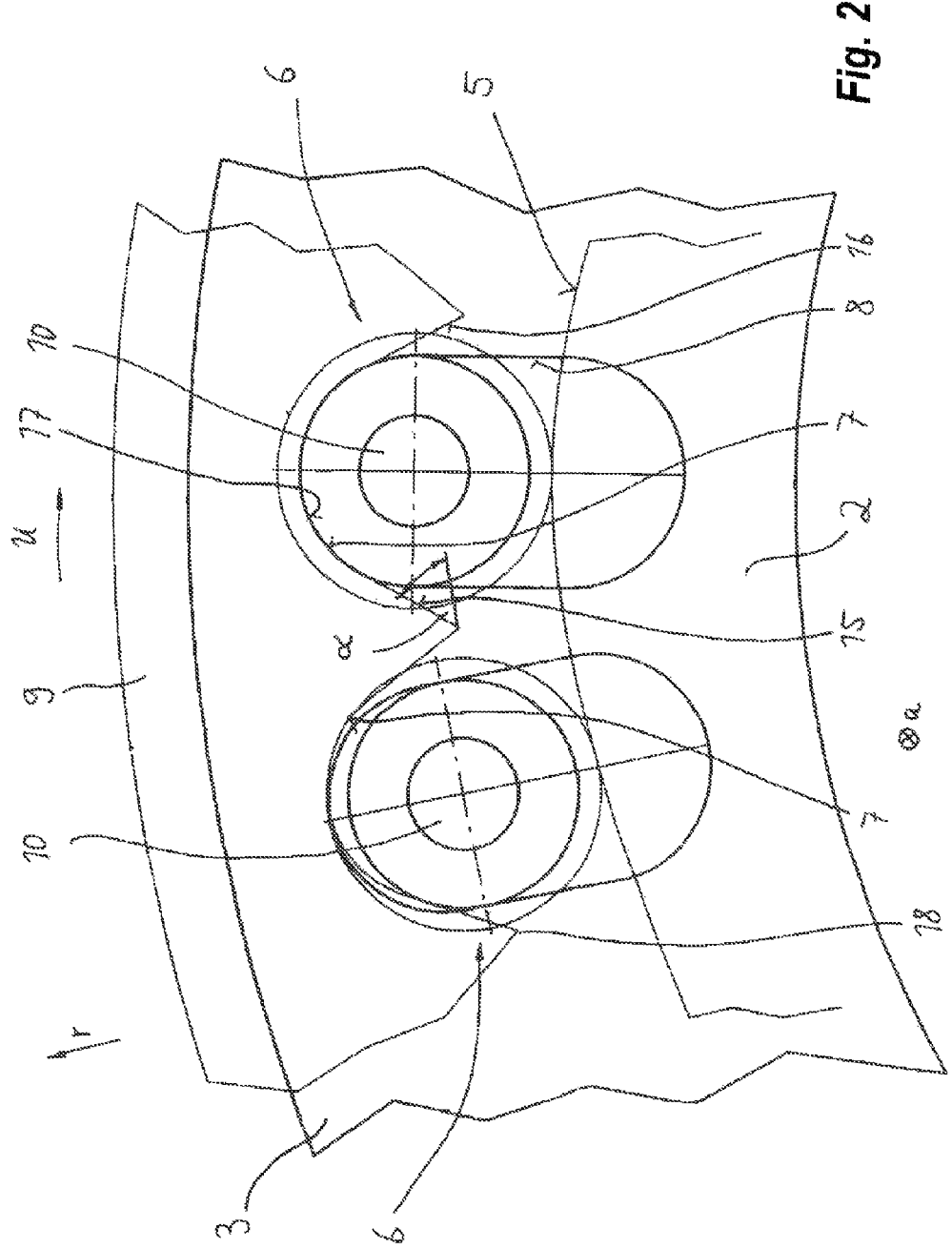
FIG. 2 is a large-scale view of a detail of FIG. 1.

The annular output element 3 consists of two parts (see FIG. 3), namely a disk 3' extending all the way in to the axis a and an L-section ring 3" that is rotationally fixed to the disk 3', with the parts 3' and 3" axially flanking the input element 2. A number j of radially inwardly open recesses 7 like those of a ring gear are formed in the parts 3' and 3" on their radially inwardly directed edges or peripheries. The exact shape of the recesses 7 is shown in FIG. 2. These recesses 7 are also all identical and arranged in axially aligned pairs.

The recesses 7 extend parallel to the axis a over the full the width of the parts 3', 3". FIG. 2 shows that each recess 7 has two planar ramps 15 and 16 that are interconnected by an arcuate part-cylindrical connecting section 17. The ramps 15 and 16 are symmetrical to a radius from the axis a that bisects the respective arcuate connecting sections 17. Adjacent flanks 15 and 16 meet against a sharp-edge point or ridge 18. The angle of the ramps 15 and 16 to the angular direction U or to a tangent to a circle centered on the axis a is shown at a.

The transmission elements 6 are movable translationally, that is in a straight line in the radial direction r in the guide grooves 8 of the two holding rings 9. As shown in FIG. 3, each transmission element 6 has a shaft 10, on which one center drive roller 11, two intermediate driven rollers 12 flanking the drive roller 11, and two outer guide rollers 13 are journaled, that is rotatably mounted. The center drive roller 11 lies in a center plane M that is perpendicular to the axis a and forms a plane of symmetry for the transmission element 6. The drive roller 11 rides on the outer peripheral surface 5 of the input element 2.

In this regard it is noted that the radial depth of each recess 7, measured from a line joining the respective points 18 to the base of the respective arcuate section 17, is equal to somewhat more than the radius of the driven rollers 12. At a point of closest approach of the surface 5 to the recesses 7, shown at the very top in FIG. 1, the surface 5 is spaced from the base of the very top recess 7 by a distance substantially equal to the diameter of the roller 11 there, so that it is snugly held in the base of this recess 7. At a point of farthest approach, that is very bottom in FIG. 1, the surface 5 is spaced so far from the recesses 7 that the roller 11 there can move past the point 18 from one recess to the next.

The two intermediate driven rollers 12 that symmetrically axially flank each of the rollers 11, ride in the recesses 7. The two outer guide rollers 13 that flank the driven rollers 12 are mounted symmetrically on the shaft 10, serving to guide the transmission element 6 in the guide grooves 8 of the holding rings 9 in the radial direction r. Thus rotation of this element 2 can move the shafts 10 via the rollers radially through a stroke between a position lodged in the radial outer ends of the respective guide grooves 8 and a position lodged in its radial inner end.

In order for the shaft 10 with its rollers to be secured against movement parallel to the axis a, two washers 14 functioning as axial abutments are mounted between the rollers 12 and 13. These washers 14 can be snap rings seated in the respective shafts 10.

It is essential that the shaft 10 of each transmission element 6 extend parallel to the axis a such that a drive section b (see FIG. 3) of the transmission element 6 that rides on the guide edge 5 of the input element 2, sections c of the transmission element 6 that axially flank the section b and ride in the recesses 7, and sections d that fit in the guides 8 are aligned along the axis a of rotation. Accordingly, the shaft 10 with its five rollers 11-13 is not held in its position by any type of bearing, but instead the five rollers 11-13 functioning as contact points hold the shaft 10 in the working position.

The number n of transmission elements 6 is lower by one than the number j of recesses 7. This means that in one revolution of the drive element 2 through 360°, the transmission elements 6 advance by one recess 7 in the angular direction U as is clear from FIG. 1. The eccentricity e with which the input element 2 is mounted with respect to the axis a has the result that a maximum stroke and a minimal stroke offset by 180° therefrom both occur at one angular position, with the result that with a large stroke, the transmission elements 6 are pushed into the recesses 7 radially outwardly, and with a small stroke up to the ridge 18, the transmission elements 6 are pushed parallel to the inside radially.

Since there is one more recess 7 than transmission elements 6, this results in the above-described migration by one recess with a rotation of 360° of the drive shaft 2. Due to the 30 transmission elements 6 provided in the illustrated embodiment with 31 recesses 7, the transmission 1 here thus has a high transmission ratio of 30:1, fast to slow. The transmission elements are thus spaced a distance apart by an angle φ of 360°/30=12° (see FIG. 1).

If the input element 2 rotates counterclockwise according to the inner arrow U in FIG. 1, this results in movement of the input element 3 in the opposite direction, i.e. as shown by the outer arrow U' in FIG. 1.

The mechanism of action of the proposed transmission can be summarized again as follows:

A shallow wedge moving horizontally lifts a roller 13 in a stationary linear guide 8 in a direction perpendicular to the wedge's path of movement. The roller 13 thereby displaces a shallow wedge standing vertically, displacing it in the horizontal direction as output. When these driving and driven movements are applied to a circular path, they create a rotational movement in which the two instant centers are identical. The transmission and transmission element (shaft plus rollers) is arranged with its guide in the base frame, centered multiply with the instant center, and assuming the transmission of torque and movement proportionately.

The lift of the rollers is created by an eccentric rotational movement at the center of the transmission. The lifting movement begins with the minimal eccentricity of the drive disk and ends on reaching the maximal eccentricity. Each roller experiences the same proportional lift per angle of rotation. Each roller reaches the starting position without torque after its lift cycle has elapsed via the falling leg of the eccentric rotational movement. The output occurs via the peripheral outer ring with its internal wedge shape.

In the illustrated embodiment the drive angle of rotation is divided into 180° for lifting the rollers and/or transmission elements and 180° for lowering the rollers and/or transmission elements. Therefore this results in an absolute uniformity of the movement sequence for the output. Thus half of the number of rollers transmits the movement while the other half is shifted back to its starting position.

Because of the contrarotational movements, separate rollers are provided on the shaft for each of the individual functions "drive," "support" and "output." These rollers all execute the same lifting movement because they all sit on the same shaft 10. The output rollers transmit the movement via radially symmetrical grooves in the output disk, the tangential portion of the movement inducing the actual rotational movement.

The shape of the rolling travel for each roller is composed of a supporting portion and a resetting portion. In a 360° revolution of the drive disk, each roller passes through a complete circular path consisting of a support portion and a resetting portion. The transmission ratio is obtained by the constant angular pitch of the rollers on the circumference.

The following example can be given: when using, for example, 30 transmission elements 6 and 31 recesses 7 on the circumference accordingly, this yields the following for a complete further conveyance of the drive path, based on 360° of the drive, from one roller to the next roller: 360°/30=12°. The transmission ratio of the transmission is thus I=30.

The transmission ratio is thus obtained exclusively from the number of transmission elements over the circumference. This is limited only by the transmission elements/rollers to be accommodated on a given circumference and the diameters thereof. The transmissible torque is limited only by the admissible pressure per unit of area for the roller and its track.

Due to the movement running strictly in the plane, this yields a disk-like structure for the structural design of this transmission. The input element is situated at the center of the transmission. The rotating drive disk 2 with its guide 5 is at the center of the stationary housing 4. The two guide rings 9 are each mounted at the left and right of the drive disk 2 in the housing 4. The drive disk 2 with the guide edges 8 running centrally with the midpoint of the drive as the paths of movement for the driven rollers 12 is arranged between the drive disk 2 and the stationary guide rings 9. Each element of this design has its own roller 11, 12, 13 as a transmission element. All the rollers of one geometry unit consisting of the cam edge 5, the supporting and reset recess 7 and the guide groove 8 are mounted on a common roller axle 10 (shaft).

The guide of the shafts 10 together with the rollers 11, 12, 13 thus does not require separate bearings—as explained.

Since this design is a closed sealable system, it is possible to implement a lifetime lubrication.

I claim:

1. A transmission comprising:
   a housing having a main axis;
   a retaining element fixed in the housing and forming a set having a predetermined number of radially extending and angularly equispaced guides;
   an output element having two parts each rotatable in the housing about the main axis, and formed with an array having a number smaller than the predetermined number of radially inwardly open recesses axially adjacent the guides with the recesses of one of the output-element parts axially aligned with the recesses of the other output-element parts;
   an input element flanked by the output-element parts, formed by a disk or ring generally centered on a center plane perpendicular to the main axis, rotatable in the housing about the main axis, and having a radial outer and generally circular peripheral surface centered on an axis radially offset from the main axis; and
   respective transmission elements symmetrical to the plane, radially displaceable in the guides between inner and outer positions, and each having a shaft extending substantially parallel to the axis with a guide section engaged and radially shiftable in the respective guide, a driven section engageable in the recesses, and a drive section radially engageable with the input-element surface, the transmission elements each having two of the driven sections aligned radially with the respective parts of the output element.

2. The transmission defined in claim 1 wherein the housing forms two of the sets of guides axially flanking the input member and the transmission elements each have two of the guide sections in the respective sets of guides.

3. The transmission defined in claim 2 wherein each of the drive sections carries a roller riding on the input-element outer surface, each of the driven sections carries a roller engageable in the respective recesses, and each of the guide sections carries a roller shiftable in the respective guide.

4. The transmission defined in claim 3 wherein on each shaft the rollers on the driven sections axially flank the roller on the drive section and the rollers on the guide sections axially flank the respective rollers on the driven sections.

5. The transmission defined in claim 3 wherein the rollers on the drive sections are of larger diameter than the rollers on the driven sections.

6. The transmission defined in claim 3 wherein each transmission element includes axial stops between the rollers for preventing axial movement of the rollers on the respective shafts.

7. A transmission comprising:
   a housing having a main axis;
   a retaining element fixed in the housing and forming a set having a predetermined number of radially extending and angularly equispaced guides;
   an output element rotatable in the housing about the axis and formed with an array having a number smaller than the predetermined number of radially inwardly open recesses axially adjacent the guides and each having a pair of flat flanks diverging radially inward;
   an input element rotatable in the housing about the axis and having a radial outer and generally circular peripheral surface centered on an axis radially offset from the main axis; and
   respective transmission elements radially displaceable in the guides between inner and outer positions and each having a shaft extending substantially parallel to the axis with a guide section engaged and radially shiftable in the respective guide, a driven section engageable in the recesses, and a drive section radially engageable with the input-element surface.

8. The transmission defined in claim 7, wherein each transmission element is symmetrical with a center plane that is perpendicular to the axis of rotation.

9. The transmission defined in claim 8, wherein the surface is a disk or ring generally centered on the center plane.

10. The transmission defined in claim 9 wherein the output element has two parts each formed with a respective array of the recesses and flanking the input element, the recesses of one part of the output element being axially aligned with the recesses of the other part of the output element, the transmission elements each having two of the driven sections aligned radially with the respective parts of the output element.

11. The transmission defined in claim 7 wherein the flanks of adjacent recesses meet at a point that is spaced radially outward from the input-element surface at a point of closest approach thereof by a distance equal to substantially less than a diameter of the drive sections.

12. The transmission defined in claim 11 wherein the radial offset of the input-element axis from the main axis is such that at a point of farthest approach from the input-element surface by a distance equal to at least a diameter of the drive sections.

* * * * *